Jan. 6, 1970  J. M. DUNN  3,487,491

BRAZIER-GRILLE CLEANING TOOL

Filed Oct. 4, 1968

INVENTOR.
JOHN M. DUNN

United States Patent Office 3,487,491
Patented Jan. 6, 1970

---

3,487,491
BRAZIER-GRILLE CLEANING TOOL
John M. Dunn, 8581 Tidewater Drive, Apt. D.,
Norfolk, Va. 23503
Filed Oct. 4, 1968, Ser. No. 765,091
Int. Cl. A47l *17/00*
U.S. Cl. 15—111    4 Claims

ABSTRACT OF THE DISCLOSURE

A cleaning tool employing a long handled shaft having at its free end a plurality of scraping tools adapted to clean food and the like off wires of different diameter and a wire brush. A scraper blade slidably engages the shaft and can be set at any position therealong.

---

Summary of the invention

An elongated shaft has a handle secured to one end. The other end of the shaft has a tip bent at right angles. Four prongs are secured to the tip and extend outward in nonparallel directions. Three prongs have curved cutting surfaces of different diameters at their free ends. The fourth prong has a wire brush secured thereto. A scraper blade is provided with means slidable along the shaft for locking the blade thereto in any position along its length.

The brush is used for cleaning the welded joints of the outer ring and cross members of the grill which is hard to get at with cleaning prongs.

The prongs having cutting surfaces are used for scraping clean the various sizes of grill wires as well as the frame ring and cross pieces to which the grille rods are welded.

The scraper blade is used to clean the brazier or bowl and has rounded edges which fit the curve of the brazier and with pressure it will also clean flat bottom braziers.

My tool eliminates the use of steel wool and also eliminates "sore hands." Cleaning is made much easier, since all food particles whether moist or dry, hard or soft, can be cleaned off after the grille and brazier have cooled off or several days later.

Detailed description of preferred embodiment

Figure 1:
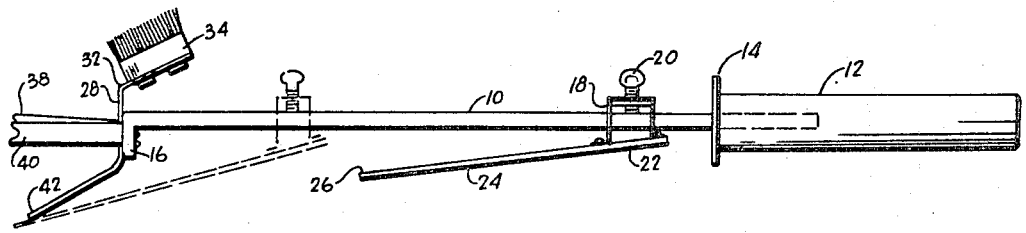
FIG. 1 is a side view of my tool.
Figure 2:
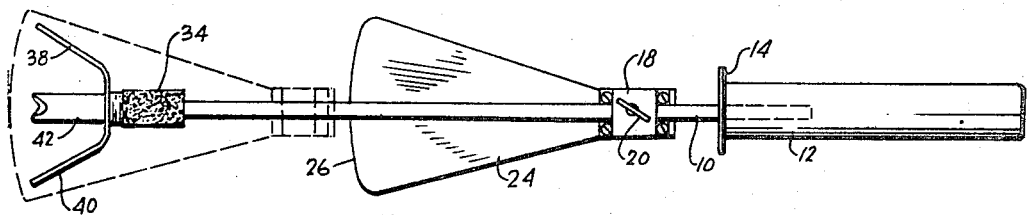
FIG. 2 is a top view thereof.
Figure 4:
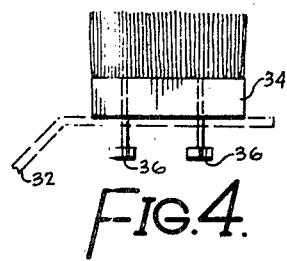
FIG. 4 is a detail view of the cleaning brush.
Figure 3:
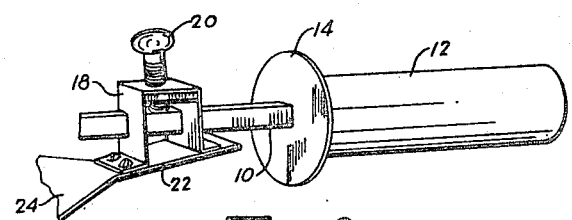
FIG. 3 is a perspective cut away view of my tool showing a portion of the scraping blade.
Figure 5:
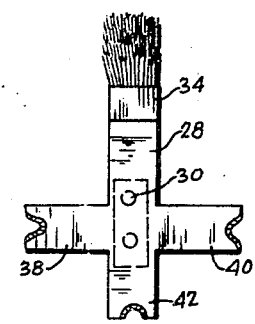
FIG. 5 is a plan view of the prongs.
Figure 6:
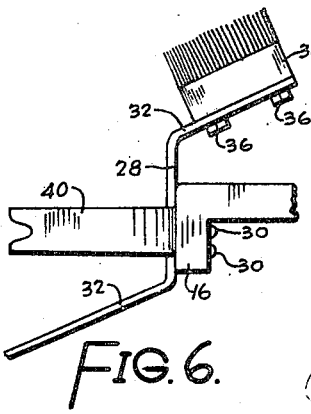
FIG. 6 is a side view of the prongs as secured to the shaft.
Figure 7:
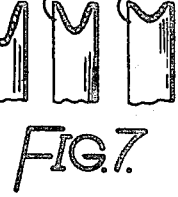
FIG. 7 illustrates the different prongs.

Referring now to FIGS. 1–7, an elongated steel shaft 10 of square cross section is secured at one end to a coaxial cylindrical handle 12 having a protection shield 14. The opposite end terminates in a short tip 16 extending at right angles to the shaft.

A U-shaped bracket 18 has holes through which the shaft extends and a thumscrew 20. The bracket is secured to a narrow end portion 22 of a scraper blade 24 having a curved front scraping edge 26. Thus the blade can be slid back and forth along the shaft and locked in place.

A short vertical late 28 secured to tip 16 by rivets 30 supports a first prong 32 which extends rearward at a 30° angle of incline and has a wire brush 34 secured thereto by bolts 36. This plate supports three additional prongs 38, 40 and 42 which extend outward at 30° angles from the plate and have different curved cutting surfaces of different diameters as shown.

While I have described my invention with particular reference to the drawings, such is not to be considered as limiting its actual scope.

Having thus described this invention, what is asserted as new is:

1. A tool for cleaning brazier-grilles, said tool comprising:
   an elongated shaft having at one end a short tip extending at right angles thereto;
   a handle secured to the other end of said shaft;
   a vertical plate secured to said tip and having four prongs extending therefrom, three of said prongs having concave cutting surfaces; said three prongs extend forwardly at 30° angles from said plate and in different directions therefrom; and
   a wire brush secured to the fourth prong.

2. A tool as set forth in claim 1 wherein said three prongs have cutting surfaces of different curvatures.

3. A tool as set forth in claim 2 wherein said fourth prong extends rearward at an angle of 30°.

4. A tool as set forth in claim 1 further including a scraper blade and means slidably engaging said shaft and secured to said blade for moving same along said shaft.

References Cited

UNITED STATES PATENTS

| | | | |
|---|---|---|---|
| 2,807,814 | 10/1957 | Leeming | 15—111 |
| 2,824,323 | 2/1958 | Tos et al. | 15—111 XR |
| 3,366,987 | 2/1968 | Givstino | 15—105 |
| 3,434,175 | 3/1969 | Bray | 15—105 |

DANIEL BLUM, Primary Examiner

U.S. Cl. X.R.

15—236; 30—303